(12) United States Patent
Waxman et al.

(10) Patent No.: US 10,225,212 B2
(45) Date of Patent: Mar. 5, 2019

(54) PROVIDING NETWORK MANAGEMENT BASED ON MONITORING QUALITY OF SERVICE (QOS) CHARACTERISTICS OF WEB REAL-TIME COMMUNICATIONS (WEBRTC) INTERACTIVE FLOWS, AND RELATED METHODS, SYSTEMS, AND COMPUTER-READABLE MEDIA

(71) Applicant: Avaya Inc., Basking Ridge, NJ (US)

(72) Inventors: Harvey S. Waxman, Holmdel, NJ (US); John H. Yoakum, Cary, NC (US)

(73) Assignee: Avaya Inc., Basking Ridge, NJ (US)

( * ) Notice: Subject to any disclaimer, the term of this patent is extended or adjusted under 35 U.S.C. 154(b) by 0 days.

(21) Appl. No.: 14/037,440

(22) Filed: Sep. 26, 2013

(65) Prior Publication Data

US 2015/0089046 A1    Mar. 26, 2015

(51) Int. Cl.
*H04L 12/24* (2006.01)
*H04L 12/26* (2006.01)
*H04L 12/931* (2013.01)

(52) U.S. Cl.
CPC ........ *H04L 49/206* (2013.01); *H04L 41/5025* (2013.01); *H04L 43/0852* (2013.01); *H04L 43/0888* (2013.01); *H04L 41/0823* (2013.01)

(58) Field of Classification Search
USPC ................................................. 709/223, 224
See application file for complete search history.

(56) References Cited

U.S. PATENT DOCUMENTS 6,714,967 B1    3/2004  Horvitz
7,107,316 B2    9/2006  Brown et al.
(Continued)

FOREIGN PATENT DOCUMENTS

EP    1615386 A1    1/2006
EP    2529316 A2    12/2012
(Continued)

OTHER PUBLICATIONS

Andreasen et al., "Session Description Protocol (SDP): Security Descriptions for Media Streams," Network Working Group, Request for Comments: 4568, Standards Track, The Internet Society, Jul. 2006, 40 pages.
(Continued)

*Primary Examiner* — Normin Abedin
*Assistant Examiner* — Hermon Asres
(74) *Attorney, Agent, or Firm* — Sheridan Ross P.C.

(57) ABSTRACT

Embodiments include providing network management based on monitoring Quality of Service (QoS) characteristics of Web Real-Time Communications (WebRTC) interactive flows, and related methods, systems, and computer-readable media. In one embodiment, a method for providing network management based on monitoring QoS characteristics of WebRTC interactive flows is provided. The method comprises obtaining, by a QoS acquisition agent of a WebRTC client executing on a computing device, a WebRTC interactive flow QoS characteristic that indicates a quality of a WebRTC interactive flow over a network. The method further comprises communicating, by the QoS acquisition agent, the WebRTC interactive flow QoS characteristic to a QoS monitoring agent external to the WebRTC client. The method additionally comprises initiating, by the QoS monitoring agent, a network management task based on the WebRTC interactive flow QoS characteristic. In this manner, QoS characteristics may be collected and correlated in order to optimize a user's WebRTC experience.

20 Claims, 6 Drawing Sheets

(56) References Cited

U.S. PATENT DOCUMENTS

| | | |
|---|---|---|
| 7,145,898 B1 | 12/2006 | Elliott |
| 7,266,591 B1 | 9/2007 | Johnston |
| 7,379,993 B2 | 5/2008 | Valdes et al. |
| 7,636,348 B2 | 12/2009 | Bettis et al. |
| 7,730,309 B2 | 6/2010 | Zimmermann |
| 8,015,484 B2 | 9/2011 | Backer |
| 8,250,635 B2 | 8/2012 | Chari et al. |
| 8,467,308 B2 | 6/2013 | Johnston |
| 8,494,507 B1 | 7/2013 | Tedesco et al. |
| 8,601,144 B1 | 12/2013 | Ryner |
| 8,605,711 B1 | 12/2013 | Sinnreich et al. |
| 8,606,950 B2 | 12/2013 | Glatron et al. |
| 8,695,077 B1 | 4/2014 | Gerhard et al. |
| 8,737,596 B2 | 5/2014 | Kelley et al. |
| 8,744,147 B2 | 6/2014 | Torti |
| 8,832,271 B2 | 9/2014 | McCarty |
| 8,856,236 B2 | 10/2014 | Moore et al. |
| 8,861,692 B1* | 10/2014 | Phelps .................. H04M 15/39 370/401 |
| 8,867,731 B2 | 10/2014 | Lum et al. |
| 2002/0161685 A1 | 10/2002 | Dwinnell |
| 2003/0112766 A1* | 6/2003 | Riedel .................. H04L 12/5695 370/252 |
| 2003/0120599 A1 | 6/2003 | Agboatwalla et al. |
| 2003/0131245 A1 | 7/2003 | Linderman |
| 2003/0188193 A1 | 10/2003 | Venkataramappa |
| 2004/0019494 A1 | 1/2004 | Ridgeway et al. |
| 2004/0081173 A1 | 4/2004 | Feather |
| 2004/0093515 A1 | 5/2004 | Reeves, Jr. |
| 2004/0167984 A1 | 8/2004 | Herrmann |
| 2004/0216173 A1 | 10/2004 | Horoszowski et al. |
| 2005/0084082 A1 | 4/2005 | Horvitz et al. |
| 2005/0177380 A1 | 8/2005 | Pritchard et al. |
| 2006/0104526 A1 | 5/2006 | Gringeler et al. |
| 2006/0155814 A1 | 7/2006 | Bennett et al. |
| 2006/0159063 A1 | 7/2006 | Kumar |
| 2006/0200855 A1 | 9/2006 | Willis |
| 2006/0230438 A1 | 10/2006 | Shappir et al. |
| 2007/0083929 A1 | 4/2007 | Sprosts et al. |
| 2007/0143408 A1 | 6/2007 | Daigle |
| 2007/0255662 A1 | 11/2007 | Tumminaro |
| 2007/0283423 A1 | 12/2007 | Bradley et al. |
| 2008/0046414 A1 | 2/2008 | Haub et al. |
| 2008/0046457 A1 | 2/2008 | Haub et al. |
| 2008/0046838 A1 | 2/2008 | Haub et al. |
| 2008/0127137 A1 | 5/2008 | Becker et al. |
| 2008/0162642 A1 | 7/2008 | Bachiri et al. |
| 2008/0192646 A1* | 8/2008 | Song .................. H04L 47/10 370/252 |
| 2008/0270541 A1 | 10/2008 | Keener et al. |
| 2008/0301053 A1* | 12/2008 | Tserkovny .......... H04L 63/0281 705/54 |
| 2009/0070477 A1 | 3/2009 | Baum et al. |
| 2009/0094684 A1 | 4/2009 | Chinnusamy et al. |
| 2009/0300060 A1 | 12/2009 | Beringer et al. |
| 2010/0011282 A1 | 1/2010 | Dollard et al. |
| 2010/0023519 A1 | 1/2010 | Kailash et al. |
| 2010/0024019 A1 | 1/2010 | Backlund |
| 2010/0037324 A1 | 2/2010 | Grant et al. |
| 2010/0118700 A1 | 5/2010 | Blum et al. |
| 2010/0246571 A1 | 9/2010 | Geppert et al. |
| 2011/0102930 A1 | 5/2011 | Johnston et al. |
| 2011/0206013 A1* | 8/2011 | Aramoto .............. H04W 36/26 370/332 |
| 2011/0238862 A1 | 9/2011 | Chaturvedi et al. |
| 2012/0001932 A1 | 1/2012 | Burnett et al. |
| 2012/0137231 A1 | 5/2012 | Maxfield et al. |
| 2012/0158862 A1 | 6/2012 | Mosko et al. |
| 2012/0192086 A1 | 7/2012 | Ghods et al. |
| 2013/0002799 A1 | 1/2013 | Mock |
| 2013/0078972 A1 | 3/2013 | Levien et al. |
| 2013/0091286 A1 | 4/2013 | Spencer |
| 2013/0138829 A1 | 5/2013 | Bulava |
| 2013/0321340 A1 | 12/2013 | Seo et al. |
| 2013/0325934 A1 | 12/2013 | Fausak et al. |
| 2013/0346329 A1 | 12/2013 | Alib-Bulatao et al. |
| 2014/0013202 A1 | 1/2014 | Schlumberger |
| 2014/0043994 A1* | 2/2014 | Bansal ................ H04L 43/0894 370/252 |
| 2014/0095633 A1 | 4/2014 | Yoakum |
| 2014/0095724 A1 | 4/2014 | Yoakum et al. |
| 2014/0095731 A1 | 4/2014 | Carey et al. |
| 2014/0108594 A1 | 4/2014 | Siegel et al. |
| 2014/0126708 A1 | 5/2014 | Sayko |
| 2014/0126714 A1* | 5/2014 | Sayko ................ H04M 3/5191 379/265.09 |
| 2014/0126715 A1* | 5/2014 | Lum .................... H04M 3/5133 379/265.09 |
| 2014/0143823 A1 | 5/2014 | Manchester et al. |
| 2014/0149512 A1 | 5/2014 | Leitch |
| 2014/0161237 A1 | 6/2014 | Tolksdorf |
| 2014/0201820 A1 | 7/2014 | Li et al. |
| 2014/0219167 A1 | 8/2014 | Santhanam et al. |
| 2014/0222894 A1 | 8/2014 | Gangadharan et al. |
| 2014/0222930 A1 | 8/2014 | Gangadharan et al. |
| 2014/0223452 A1 | 8/2014 | Santhanam et al. |
| 2014/0237057 A1 | 8/2014 | Khodorenko |
| 2014/0241215 A1 | 8/2014 | Massover et al. |
| 2014/0244235 A1 | 8/2014 | Michaelis |
| 2014/0245143 A1 | 8/2014 | Saint-Marc |
| 2014/0258822 A1 | 9/2014 | Li et al. |
| 2014/0269326 A1 | 9/2014 | Westin et al. |
| 2014/0270104 A1 | 9/2014 | O'Connor |
| 2014/0280734 A1 | 9/2014 | Chaturvedi et al. |
| 2014/0282054 A1 | 9/2014 | Yoakum |
| 2014/0282135 A1 | 9/2014 | Segre |
| 2014/0282399 A1 | 9/2014 | Gorelik et al. |
| 2014/0282765 A1 | 9/2014 | Casey et al. |
| 2014/0282903 A1 | 9/2014 | Singh et al. |
| 2014/0324979 A1 | 10/2014 | Gao et al. |
| 2014/0325078 A1 | 10/2014 | Shan et al. |
| 2014/0334169 A1 | 11/2014 | Ewert et al. |
| 2014/0344169 A1 | 11/2014 | Phelps et al. |
| 2014/0348044 A1 | 11/2014 | Narayanan et al. |
| 2014/0365676 A1 | 12/2014 | Yoakum |
| 2014/0379931 A1 | 12/2014 | Gaviria |
| 2015/0002614 A1 | 1/2015 | Zino et al. |
| 2015/0002619 A1 | 1/2015 | Johnston et al. |
| 2015/0006610 A1 | 1/2015 | Johnston et al. |
| 2015/0006611 A1 | 1/2015 | Johnston et al. |
| 2015/0026473 A1 | 1/2015 | Johnston et al. |
| 2015/0036690 A1 | 2/2015 | Pastro |
| 2015/0039687 A1 | 2/2015 | Waxman et al. |
| 2015/0039760 A1 | 2/2015 | Yoakum |
| 2015/0052067 A1 | 2/2015 | Thiyagarajan et al. |
| 2015/0180825 A1 | 6/2015 | Ren et al. |

FOREIGN PATENT DOCUMENTS

| | | |
|---|---|---|
| EP | 2530875 A1 * | 12/2012 |
| GB | 2295747 A | 6/1996 |
| GB | 2468758 A | 9/2010 |
| GB | 2468759 A | 9/2010 |
| GB | 2517833 A | 3/2015 |
| JP | 2002207683 A | 7/2002 |
| JP | 2002374318 A | 12/2002 |
| JP | 2005346556 A | 12/2005 |
| JP | 2006050407 A | 2/2006 |
| JP | 2011504665 A | 2/2011 |
| WO | 2014060008 A1 | 4/2014 |
| WO | WO 2014123738 * | 8/2014 |
| WO | 2014190094 A1 | 11/2014 |
| WO | 2015032277 A1 | 3/2015 |

OTHER PUBLICATIONS

Baugher et al., "The Secure Real-time Transport Protocol (SRTP)," Network Working Group, Request for Comments: 3711, Standards Track, The Internet Society, Mar. 2004, 51 pages.

(56) References Cited

OTHER PUBLICATIONS

Johnston et al., "WebRTC: APIs and RTCWEB Protocols of the HTML5 Real-Time Web," (Book), Second Edition, Smashwords Edition, Digital Codex LLC, Jun. 2013, 254 pages.
Mahy et al., "Traversal Using Relays around NAT (TURN) : Relay Extensions to Session Traversal Utilities for NAT (STUN)," Internet Engineering Task Force, Request for Comments: 5766, Standards Track, IETF Trust, Apr. 2010, 61 pages.
McGrew et al., "Datagram Transport Layer Security (DTLS) Extension to Establish Keys for the Secure Real-Time Transport Protocol (SRTP)," Internet Engineering Task Force, Request for Comments: 5764, Standards Track, IETF Trust, May 2010, 24 pages.
Zimmermann et al., "ZRTP: Media Path Key Agreement for Unicast Secure RTP," Internet Engineering Task Force, Request for Comments: 6189, Informational, IETF Trust, Apr. 2011, 102 pages.
Johnston, Alan et al., "Taking on WebRTC in an Enterprise," IEEE Communications Magazine, Apr. 2013, pp. 48-54, vol. 51, Issue 4.
Search Report for British patent application GB1317121.0 dated Mar. 14, 2014, 3 pages.
Search Report for British patent application GB1317122.8 dated Mar. 11, 2014, 3 pages.
Singh, Kundan et al., "Building Communicating Web Applications Leveraging Endpoints and Cloud Resource Service," Presented at the Sixth International Conference on Cloud Computing, Jun. 28, 2013, Santa Clara, California, IEEE Computer Society, pp. 486-493.
Singh, Kundan et al., "Private Overlay of Enterprise Social Data and Interactions in the Public Web Context," presented at the 9th IEEE International Conference on Collaborative Computing: Networking, Applications and Worksharing (Collaboratecom), Oct. 20-23, 2013, Austin, Texas, IEEE, 10 pages.
Berners-Lee, Tim, "Socially Aware Cloud Storage," Notes on web design, Aug. 17, 2009, http://www.w3.org/Designissues/CloudStorage.html, 9 pages.
Chandra, Ramesh et al., "Separating Web Applications from User Data Storage with BStore," presented at the USENIX Conference on Web Application Development, Jun. 2010, Boston, Massachusettes, 13 pages.
Davids, Carol et al., "SIP APIs for Voice and Video Communications on the Web," presented at the International Conference on Principles, Systems and Applications of IP Telecommunications (IPTcomm), Aug. 2011, Chicago, Illinois, 7 pages.
Geambasu, Roxana et al., "Organizing and Sharing Distributed Personal Web-Service Data," presented at the International World Wide Web Conference, Apr. 21-25, 2008, Beijing, China, International World Wide Web Conference Committee, pp. 755-764.
Hsu, F. et al., "Secure File System Services for Web 2.0 Applications," presented at the ACM Cloud Computing Security Workshop, Nov. 13, 2009, Chicago, Illinois, Association for Computing Machinery, 7 pages.
Joshi, R., "Data-Oriented Architecture: A Loosley Coupled Real-Time SOA," Whitepaper, Aug. 2007, Real-Time Innovations, Inc., http://rtcgroup.com/whitepapers/files/RTI_DataOrientedArchitecture_WhitePaper.pdf, 54 pages.
Vahdat, Amin et al., "WebFS: A Global Cache Coherent File System," UC Berkeley, Dec. 1996, retrieved Sep. 16, 2014 from https://www.cs.duke.edu/~vahdat/webfs/webfs.html, 12 pages.
Barth, A. "The Web Origin Concept," Internet Engineering Task Force (IETF), Request for Comments 6454 (RFC 6454), Dec. 2011, 19 pages, http://www.ietf.org/rfc/rfc6454.txt.
Fischl, J. et al., "Framework for Establishing a Secure Real-time Transport Protocol (SRTP) Security Context Using Datagram Transport Layer Security (DTLS)," Internet Engineering Task Force (IETF), Request for Comments (RFC) 5763, May 2010, 26 pages.
Jesup, R. et al., "DTLS Encapsulation of SCTP Packets for RTCWEB," IETF: Network Working Group, Internet Draft, Feb. 16, 2013, 6 pages.
Johnston, A. et al., "An Origin Attribute for the STUN Protocol," Internet Engineering Task Force (IETF), Internet-Draft, Jul. 20, 2014, 14 pages, https://tools.ietf.org/html/draft-ieff-tram-stun-origin-00.
Rescorla, E., "Security Considerations for RTC-Web," IETF RTCWEB, Internet Draft, Jan. 22, 2013, 16 pages.
Rescorla, E., "WebRTC Security Architecture," IETF RTCWEB, Internet Draft, Jul. 14, 2013, 30 pages.
Corrected Notice of Allowability for U.S. Appl. No. 13/931,968, dated Apr. 24, 2015, 4 pages.
Non-Final Office Action for U.S. Appl. No. 13/931,970, dated May 7, 2015, 9 pages.
Search Report for British Patent Application GB1419338.7, dated Apr. 27, 2015, 4 pages.
Search Report for British Patent Application GB1419334.6, dated Apr. 28, 2015, 6 pages.
Notice of Allowance for U.S. Appl. No. 13/944,368, dated Apr. 1, 2015, 8 pages.
Non-Final Office Action for U.S. Appl. No. 13/931,967, dated May 5, 2015, 10 pages.
Notice of Allowance for U.S. Appl. No. 13/931,968, dated Mar. 23, 2015, 7 pages.
Final Office Action for U.S. Appl. No. 13/835,913, dated Mar. 26, 2015, 17 pages.
Non-Final Office Action for U.S. Appl. No. 14/068,839, dated Feb. 20, 2015, 15 pages.
Loreto, Salvatore et al., "Real-Time Communications in the Web: Issues, Achievements, and Ongoing Standardization Efforts," IEEE Internet Computing, vol. 16, Issue 5, IEEE Computer Society, Oct. 2, 2012, pp. 68-73.
Search Report for British patent application GB1411584.4 dated Dec. 30, 2014, 4 pages.
Search Report for British patent application GB1411580.2 dated Dec. 30, 2014, 4 pages.
Non-Final Office Action for U.S. Appl. No. 13/931,968, dated Dec. 8, 2014, 6 pages.
Non-Final Office Action for U.S. Appl. No. 13/835,913, dated Nov. 20, 2014, 15 pages.
Non-Final Office Action for U.S. Appl. No. 13/803,292, dated Jan. 27, 2015, 13 pages.
Non-Final Office Action for U.S. Appl. No. 14/050,891, dated Jan. 29, 2015, 9 pages.
Non-Final Office Action for U.S. Appl. No. 13/955,023, dated Feb. 2, 2015, 12 pages.
Bergkvist, Adam et al., "WebRTC 1.0: Real-time Communication Between Browsers," W3C Working Draft, Feb. 9, 2012, http://www.w3.org/TR/2012/WD-webrtc-20120209/, 42 pages.
Notice of Reason for Refusal for Japanese Patent Application 2013-201228, dated Jun. 11, 2015, 8 pages.
Advisory Action for U.S. Appl. No. 13/835,913, dated Jun. 10, 2015, 3 pages.
Final Office Action for U.S. Appl. No. 13/803,292, dated Jun. 12, 2015, 17 pages.
Final Office Action and Examiner Initiated Interview Summary for U.S. Appl. No. 14/050,891, dated Jun. 29, 2015, 11 pages.
Final Office Action for U.S. Appl. No. 13/955,023, dated Jul. 20, 2015, 17 pages.
Corrected Notice of Allowability for U.S. Appl. No. 13/944,368, dated Jul. 23, 2015, 4 pages.
Non-Final Office Action for U.S. Appl. No. 14/141,798, dated Jul. 17, 2015, 13 pages.
Extended European Search Report for European Patent Application 15161452.6, dated Jun. 23, 2015, 5 pages.
Non-Final Office Action for U.S. Appl. No. 13/955,711, dated Nov. 9, 2015, 10 pages.
Notice of Allowance for U.S. Appl. No. 14/050,891, dated Nov. 10, 2015, 10 pages.
Non-Final Office Action for U.S. Appl. No. 13/955,023, dated Dec. 9, 2015, 13 pages.
Advisory Action for U.S. Appl. No. 13/931,967, dated Nov. 3, 2015, 3 pages.
Advisory Action for U.S. Appl. No. 13/931,970, dated Nov. 5, 2015, 3 pages.
Non-Final Office Action for U.S. Appl. No. 14/068,943, dated Dec. 2, 2015, 16 pages.
Non-Final Office Action for U.S. Appl. No. 14/255,429, dated Nov. 9, 2015, 26 pages.

(56) References Cited

OTHER PUBLICATIONS

Search Report for British Patent Application No. GB1423089.0, dated Jul. 6, 2015, 4 pages.
Author Unknown, "WebRTC," WebRTC.org, Date Accessed: Jan. 26, 2016, 4 pages, http://webrtc.org/.
Notice of Allowance for U.S. Appl. No. 13/863,662, dated Feb. 1, 2016, 17 pages.
Advisory Action and Examiner-Initiated Interview Summary for U.S. Appl. No. 14/068,839, dated Feb. 12, 2016, 4 pages.
Final Office Action for U.S. Appl. No. 14/141,798, dated Dec. 24, 2015, 10 pages.
Non-Final Office Action for U.S. Appl. No. 14/174,371, dated Feb. 18, 2016, 18 pages.
Non-Final Office Action for U.S. Appl. No. 13/931,970, dated Feb. 23, 2016, 11 pages.
Rodriguez, Pedro et al., "Advanced Videoconferencing Services Based on WebRTC," IADIS International Conferences Web Based Communities and Social Media 2012 and Collaborative Technologies 2012, Jul. 17-23, 2012, pp. 180-184, http://www.iadisportal.org/wbc-2012-proceedings.
Examination Report for British Patent Application GB1411584.4, dated Aug. 21, 2015, 1 page.
Examination Report for British Patent Application GB1411580.2, dated Aug. 21, 2015, 1 pages.
Notification of Reasons for Refusal for Japanese Patent Application 2013-201221, dated Aug. 25, 2015, 8 pages.
Non-Final Office Action for U.S. Appl. No. 13/835,913, dated Sep. 3, 2015, 19 pages.
Non-Final Office Action for U.S. Appl. No. 13/912,520, dated Sep. 9, 2015, 21 pages.
Non-Final Office Action for U.S. Appl. No. 13/863,662, dated Sep. 25, 2015, 23 pages.
Advisory Action for U.S. Appl. No. 13/803,292, dated Aug. 21, 2015, 3 pages.
Non-Final Office Action for U.S. Appl. No. 13/803,292, dated Oct. 9, 2015, 13 pages.
Advisory Action and Examiner-Initiated Interview Summary for U.S. Appl. No. 14/050,891, dated Sep. 29, 2015, 4 pages.
Final Office Action for U.S. Appl. No. 14/068,839, dated Sep. 9, 2015, 17 pages.
Final Office Action for U.S. Appl. No. 13/931,967, dated Aug. 20, 2015, 12 pages.
Final Office Action for U.S. Appl. No. 13/931,970, dated Aug. 27, 2015, 10 pages.
Notice of Allowance for China Patent Application No. 201410499672.1, dated Dec. 18, 2017 3 pages.

* cited by examiner

PROVIDING NETWORK MANAGEMENT BASED ON MONITORING QUALITY OF SERVICE (QOS) CHARACTERISTICS OF WEB REAL-TIME COMMUNICATIONS (WEBRTC) INTERACTIVE FLOWS, AND RELATED METHODS, SYSTEMS, AND COMPUTER-READABLE MEDIA

BACKGROUND

Field of the Disclosure

The technology of the disclosure relates generally to Web Real-Time Communications (WebRTC) interactive flows.

Technical Background

Web Real-Time Communications (WebRTC) is an ongoing effort to develop industry standards for integrating real-time communications functionality into web clients, such as web browsers, to enable direct interaction with other web clients. This real-time communications functionality is accessible by web developers via standard markup tags, such as those provided by version 5 of the Hypertext Markup Language (HTML5), and client-side scripting Application Programming Interfaces (APIs) such as JavaScript APIs. More information regarding WebRTC may be found in "WebRTC: APIs and RTCWEB Protocols of the HTML5 Real-Time Web," by Alan B. Johnston and Daniel C. Burnett, $2^{nd}$ Edition (2013 Digital Codex LLC), which is incorporated in its entirety herein by reference.

WebRTC provides built-in capabilities for establishing real-time video, audio, and/or data streams in both point-to-point interactive flows and multi-party interactive flows. The WebRTC standards are currently under joint development by the World Wide Web Consortium (W3C) and the Internet Engineering Task Force (IETF). Information on the current state of WebRTC standards can be found at, e.g., http://www.w3c.org and http://www.ietf.org.

To establish a WebRTC interactive flow (e.g., a real-time video, audio, and/or data exchange), two WebRTC clients may retrieve WebRTC-enabled web applications, such as HTML5/JavaScript web applications, from a web application server. Through the web applications, the two WebRTC clients then engage in dialogue for initiating a peer connection over which the WebRTC interactive flow will pass. This dialogue may include a media negotiation established to communicate and reach an agreement regarding parameters that define initial characteristics of the WebRTC interactive flow.

In some embodiments, the media negotiation may be implemented via a WebRTC offer/answer exchange. A WebRTC offer/answer exchange typically occurs via a secure network connection such as a Hyper Text Transfer Protocol Secure (HTTPS) connection or a Secure WebSockets connection. In a WebRTC offer/answer exchange, a first WebRTC client on a sender computing device sends an "offer" to a second WebRTC client on a recipient computing device. The offer includes a WebRTC session description object that specifies media types and capabilities that the first WebRTC client supports and prefers for use in the WebRTC interactive flow. The second WebRTC client then responds with a WebRTC session description object "answer" that indicates which of the offered media types and capabilities are supported and acceptable by the second WebRTC client for the WebRTC interactive flow. It is to be understood that the dialogue may employ mechanisms other than a WebRTC offer/answer exchange to establish a WebRTC interactive flow between the WebRTC clients. Once the dialogue is complete, the WebRTC clients may then establish a direct peer connection with one another, and may begin an exchange of media and/or data packets transporting real-time communications. The peer connection between the WebRTC clients typically employs the Secure Real-time Transport Protocol (SRTP) to transport real-time media flows, and may utilize various other protocols for real-time data interchange.

WebRTC includes mechanisms for enabling WebRTC clients to obtain detailed information regarding various Quality of Service (QoS) characteristics of WebRTC interactive flows. These QoS characteristics may be used by a WebRTC client to dynamically monitor and adjust the handling of a WebRTC interactive flow. For example, in response to a decrease in network throughput, a WebRTC client may be able to compensate by adjusting a video or audio resolution, or by selecting a more appropriate codec for encoding the WebRTC interactive flow. However, these QoS characteristics may not be accessible outside the WebRTC client, and thus may not be available to external entities (e.g., enterprises) to monitor, characterize, and optimize a network over which the WebRTC interactive flow passes.

SUMMARY OF THE DETAILED DESCRIPTION

Embodiments disclosed in the detailed description include providing network management based on monitoring Quality of Service (QoS) characteristics of Web Real-Time Communications (WebRTC) interactive flows. Related methods, systems, and computer-readable media are also disclosed. In some embodiments, a WebRTC client comprises a QoS acquisition agent that is communicatively coupled to a QoS monitoring agent external to the WebRTC client. As the WebRTC client participates in a WebRTC interactive flow, the QoS acquisition agent obtains a WebRTC interactive flow QoS characteristic that indicates a quality of the WebRTC interactive flow. The QoS acquisition agent then communicates the WebRTC interactive flow QoS characteristic to the QoS monitoring agent. The QoS monitoring agent initiates a network management task based on the WebRTC interactive flow QoS characteristic. As non-limiting examples, the network management task may include initiating a network modification, automatically triggering an alarm, causing an automatic or semi-automatic script to execute, and/or storing the WebRTC interactive flow QoS characteristic for subsequent correlation and analysis. The QoS monitoring agent may also correlate two or more stored QoS characteristics, and initiate the network management task based on the correlation. The network management task may also include generating a report and/or initiating a network modification based on the correlation, as non-limiting examples. Some embodiments may provide that the QoS monitoring agent may also receive, store, and/or correlate a QoS characteristic provided by a network element, and/or a WebRTC data flow QoS characteristic indicating a quality of a WebRTC data flow between the QoS acquisition agent and the QoS monitoring agent.

In this regard, in one embodiment, a method for providing network management based on monitoring QoS characteristics of WebRTC interactive flows is provided. The method comprises obtaining, by a QoS acquisition agent of a WebRTC client executing on a computing device, a WebRTC interactive flow QoS characteristic that indicates a quality of a WebRTC interactive flow over a network. The method further comprises communicating, by the QoS acquisition agent, the WebRTC interactive flow QoS characteristic to a QoS monitoring agent external to the WebRTC client. The method additionally comprises initiating, by the QoS monitoring agent, a network management task based on the WebRTC interactive flow QoS characteristic.

In another embodiment, a system for providing network management based on monitoring QoS characteristics of WebRTC interactive flows is provided. The system comprises at least one communications interface, a first computing device associated with the at least one communications interface and comprising a QoS acquisition agent, and a second computing device comprising a QoS monitoring agent. The QoS acquisition agent is configured to obtain a WebRTC interactive flow QoS characteristic that indicates a quality of a WebRTC interactive flow over a network. The QoS acquisition agent is further configured to communicate the WebRTC interactive flow QoS characteristic to the QoS monitoring agent. The QoS monitoring agent is configured to initiate a network management task based on the WebRTC interactive flow QoS characteristic.

In another embodiment, a non-transitory computer-readable medium is provided. The non-transitory computer-readable medium has stored thereon computer-executable instructions to cause a processor to implement a method comprising obtaining, by a QoS acquisition agent of a WebRTC client, a WebRTC interactive flow QoS characteristic that indicates a quality of a WebRTC interactive flow over a network. The method implemented by the computer-executable instructions further comprises communicating, by the QoS acquisition agent, the WebRTC interactive flow QoS characteristic to a QoS monitoring agent external to the WebRTC client. The method implemented by the computer-executable instructions also comprises initiating, by the QoS monitoring agent, a network management task based on the WebRTC interactive flow QoS characteristic.

BRIEF DESCRIPTION OF THE FIGURES

The accompanying drawing figures incorporated in and forming a part of this specification illustrate several aspects of the disclosure, and together with the description serve to explain the principles of the disclosure.

DETAILED DESCRIPTION

Figure 1:
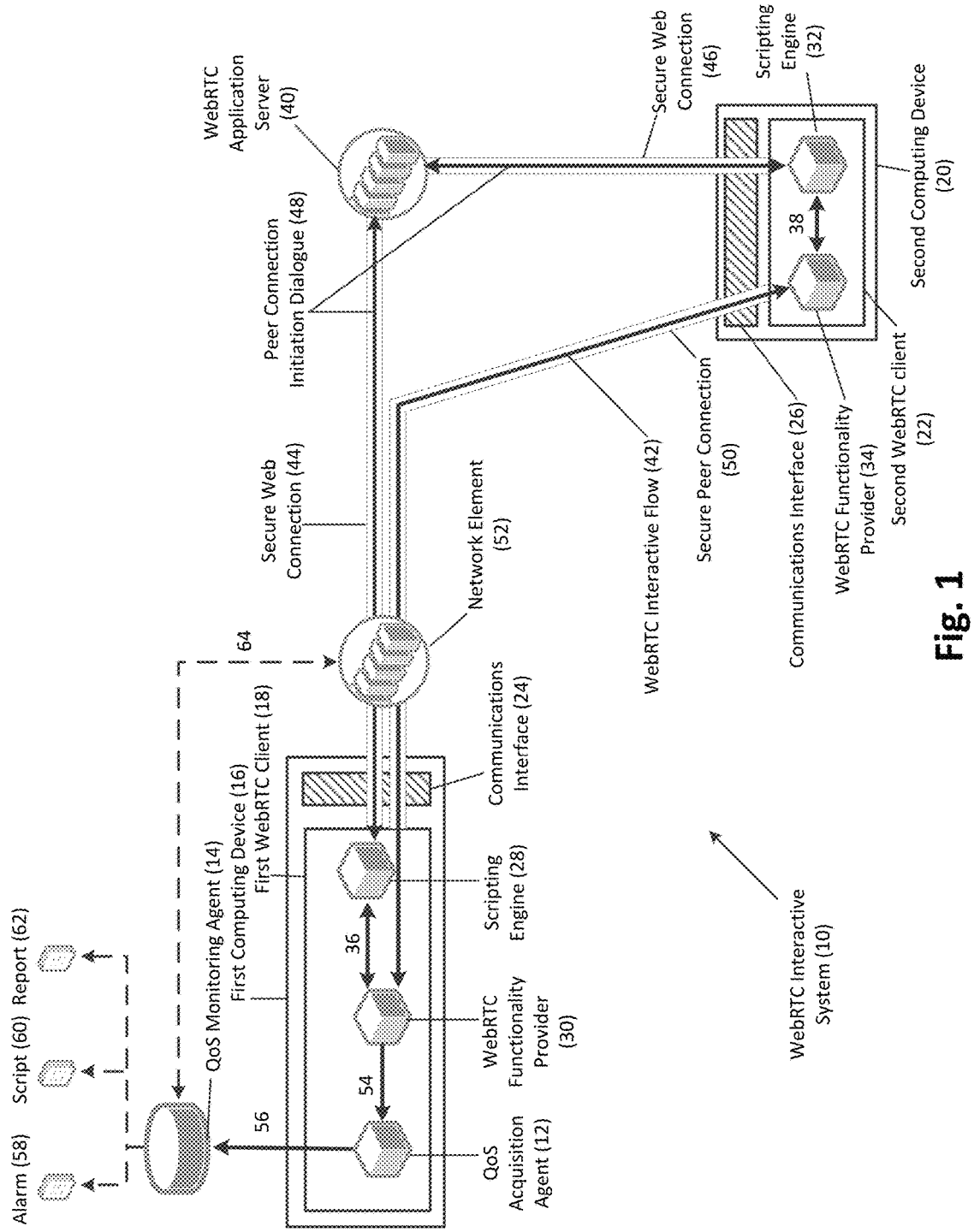
FIG. 1 is a conceptual diagram showing an exemplary "triangle" topology of a Web Real-Time Communications (WebRTC) interactive flow including a WebRTC client comprising a Quality of Service (QoS) acquisition agent communicatively coupled to a QoS monitoring agent.

With reference now to the drawing figures, several exemplary embodiments of the present disclosure are described. The word "exemplary" is used herein to mean "serving as an example, instance, or illustration." Any embodiment described herein as "exemplary" is not necessarily to be construed as preferred or advantageous over other embodiments.

Embodiments disclosed in the detailed description include providing network management based on monitoring Quality of Service (QoS) characteristics of Web Real-Time Communications (WebRTC) interactive flows. Related methods, systems, and computer-readable media are also disclosed. In some embodiments, a WebRTC client comprises a QoS acquisition agent that is communicatively coupled to a QoS monitoring agent external to the WebRTC client. As a WebRTC interactive flow progresses, the QoS acquisition agent obtains a WebRTC interactive flow QoS characteristic that indicates a quality of the WebRTC interactive flow. The QoS acquisition agent then communicates the WebRTC interactive flow QoS characteristic to the QoS monitoring agent. The QoS monitoring agent initiates a network management task based on the WebRTC interactive flow QoS characteristic. As non-limiting examples, the network management task may include initiating a network modification, automatically triggering an alarm, causing an automatic or semi-automatic script to execute, and/or storing the WebRTC interactive flow QoS characteristic for subsequent correlation and analysis. The QoS monitoring agent may also correlate two or more stored QoS characteristics, and initiate the network management task based on the correlation. The network management task may also include generating a report and/or initiating a network modification based on the correlation, as non-limiting examples. Some embodiments may provide that the QoS monitoring agent may also receive, store, and/or correlate a QoS characteristic provided by a network element, and/or a WebRTC data flow QoS characteristic indicating a quality of a WebRTC data flow between the QoS acquisition agent and the QoS monitoring agent.

In this regard, in one embodiment, a method for providing network management based on monitoring QoS characteristics of WebRTC interactive flows is provided. The method comprises obtaining, by a QoS acquisition agent of a WebRTC client executing on a computing device, a WebRTC interactive flow QoS characteristic that indicates a quality of a WebRTC interactive flow over a network. The method further comprises communicating, by the QoS acquisition agent, the WebRTC interactive flow QoS characteristic to a QoS monitoring agent external to the WebRTC client. The method additionally comprises initiating, by the QoS monitoring agent, a network management task based on the WebRTC interactive flow QoS characteristic.

In this regard, FIG. 1 shows an exemplary WebRTC interactive system 10 for providing network management based on monitoring QoS characteristics of WebRTC interactive flows as disclosed herein. In particular, the exemplary WebRTC interactive system 10 includes a QoS acquisition agent 12 that provides a point for acquiring QoS characteristics of a WebRTC interactive flow, which otherwise may be inaccessible to external network elements. Additionally, the exemplary WebRTC interactive system 10 includes a QoS monitoring agent 14 that is communicatively coupled to the QoS acquisition agent 12, and that may initiate a network management task based on received QoS characteristics. The QoS monitoring agent 14 may also store and correlate QoS characteristics, and may initiate a network management task based on the correlation. As used herein, a "WebRTC interactive flow" refers to an interactive media flow and/or an interactive data flow that passes between or among two or more endpoints according to WebRTC standards and protocols. As non-limiting examples, an interactive media flow constituting a WebRTC interactive flow may comprise a real-time audio stream and/or a real-time video stream, or other real-time media and/or data streams.

Before discussing details of the QoS acquisition agent 12 and the QoS monitoring agent 14, the establishment of a WebRTC interactive flow in the WebRTC interactive system 10 of FIG. 1 is first described. In FIG. 1, a first computing device 16 executes a first WebRTC client 18, and a second computing device 20 executes a second WebRTC client 22. It is to be understood that the first and second computing devices 16 and 20 may both be located within a same public or private network, or may be located within separate, communicatively coupled public or private networks. Some embodiments of the WebRTC interactive system 10 of FIG. 1 may provide that each of the first and second computing devices 16 and 20 may be any computing device having network communications capabilities, such as a smartphone, a tablet computer, a dedicated web appliance, a media server, a desktop or server computer, or a purpose-built communications device, as non-limiting examples. The first and second computing devices 16 and 20 include communications interfaces 24 and 26 respectively, for connecting the first and second computing devices 16 and 20 to one or more public and/or private networks. In some embodiments, the elements of the first and second computing devices 16 and 20 may be distributed across more than one computing device 16, 20.

The first and second WebRTC clients 18 and 22, in this example, may each be a web browser application, a dedicated communications application, or an interface-less application such as a daemon or service application, as non-limiting examples. The first WebRTC client 18 comprises a scripting engine 28 and a WebRTC functionality provider 30. Similarly, the second WebRTC client 22 comprises a scripting engine 32 and a WebRTC functionality provider 34. The scripting engines 28 and 32 enable client-side applications written in a scripting language, such as JavaScript, to be executed within the first and second WebRTC clients 18 and 22, respectively. The scripting engines 28 and 32 also provide Application Programming Interfaces (APIs) to facilitate communications with other functionality providers within the first and/or second WebRTC clients 18, 22, with the first and/or second computing devices 16, 20, and/or with other web clients, user devices, or web servers. The WebRTC functionality provider 30 of the first WebRTC client 18 and the WebRTC functionality provider 34 of the second WebRTC client 22 implement the protocols, codecs, and APIs necessary to enable real-time interactive flows via WebRTC. The scripting engine 28 and the WebRTC functionality provider 30 are communicatively coupled via a set of defined APIs, as indicated by bidirectional arrow 36. Likewise, the scripting engine 32 and the WebRTC functionality provider 34 are communicatively coupled as shown by bidirectional arrow 38.

A WebRTC application server 40 provides a WebRTC web application (not shown) to the requesting first and second WebRTC clients 18, 22. In some embodiments, the WebRTC application server 40 may be a single server, while in some applications the WebRTC application server 40 may comprise multiple servers that are communicatively coupled to each other. It is to be understood that the WebRTC application server 40 may reside within the same public or private network as the first and second computing devices 16 and/or 20, or may be located within a separate, communicatively coupled public or private network.

FIG. 1 further illustrates the characteristic WebRTC "triangle" topology that results from establishing a WebRTC interactive flow 42 between the first WebRTC client 18 and the second WebRTC client 22. To establish the WebRTC interactive flow 42, the first WebRTC client 18 and the second WebRTC client 22 both download a same WebRTC web application (not shown) from the WebRTC application server 40. In some embodiments, the WebRTC web application comprises an HTML5/JavaScript web application that provides a rich user interface using HTML5, and uses JavaScript to handle user input and to communicate with the WebRTC application server 40.

The first WebRTC client 18 and the second WebRTC client 22 then establish secure web connections 44 and 46, respectively, with the WebRTC application server 40, and engage in a peer connection initiation dialogue 48. The peer connection initiation dialogue 48 may include any data transmitted between or among the first WebRTC client 18, the second WebRTC client 22, and/or the WebRTC application server 40 to establish a peer connection for the WebRTC interactive flow 42. The peer connection initiation dialogue 48 may include WebRTC session description objects, Hyper Text Transfer Protocol (HTTP) header data, certificates, cryptographic keys, and/or network routing data, as non-limiting examples. In some embodiments, the peer connection initiation dialogue 48 may comprise a WebRTC offer/answer exchange. Data exchanged during the peer connection initiation dialogue 48 may be used to determine the media types and capabilities for the desired WebRTC interactive flow 42. Once the peer connection initiation dialogue 48 is complete, the WebRTC interactive flow 42 may be established via a secure peer connection 50 between the first WebRTC client 18 and the second WebRTC client 22. Accordingly, in FIG. 1 the vertices of the WebRTC "triangle" are the WebRTC application server 40, the first WebRTC client 18, and the second WebRTC client 22. The edges of the "triangle" are represented by the secure web connections 44, 46 and the secure peer connection 50.

It is to be understood that some embodiments may utilize topographies other than the WebRTC "triangle" topography illustrated in FIG. 1. For example, some embodiments may employ a "trapezoid" topography in which two web servers communicate directly with each other via protocols such as Session Initiation Protocol (SIP) or Jingle, as non-limiting examples. It is to be further understood that, instead of the second WebRTC client 22, the second computing device 20 may comprise a SIP client device, a Jingle client device, or a Public Switched Telephone Network (PSTN) gateway device that is communicatively coupled to a telephone.

In some embodiments, the secure web connection 44 and/or the secure peer connection 50 may pass through a network element 52. The network element 52 may be a computing device having network communications capabilities and providing media transport and/or media processing functionality. As a non-limiting example, the network element 52 may be a Traversal Using Relays around NAT (TURN) server.

In the example of FIG. 1, the resulting WebRTC interactive flow 42 passes between the first WebRTC client 18 and the second WebRTC client 22 via the secure peer connection 50. As the WebRTC interactive flow 42 progresses, the first and second WebRTC clients 18 and 22 may determine various QoS characteristics of the WebRTC interactive flow 42, and may adjust their functionality accordingly. However, it may be impracticable or impossible for an entity over whose network the WebRTC interactive flow 42 takes place to determine and utilize the QoS characteristics of the WebRTC interactive flow 42. For example, if the first WebRTC client 18 is part of an enterprise network, elements of the enterprise network responsible for maintaining minimum QoS standards may be unable to determine whether the enterprise network is providing sufficient resources to support the WebRTC interactive flow 42.

In this regard, the QoS acquisition agent 12 and the QoS monitoring agent 14 of FIG. 1 are provided. The QoS acquisition agent 12 is communicatively coupled to the WebRTC functionality provider 30 of the first WebRTC client 18, as indicated by arrow 54. In some embodiments, the QoS acquisition agent 12 may be implemented as an extension or plug-in for the first WebRTC client 18, may be integrated into the WebRTC functionality provider 30 and/or the scripting engine 28, and/or may be part of the WebRTC web application (not shown) downloaded from the WebRTC application server 40. The QoS acquisition agent 12 is configured to obtain, from the WebRTC functionality provider 30, a WebRTC interactive flow QoS characteristic (not shown) indicating a quality of the WebRTC interactive flow 42. In some embodiments, the QoS acquisition agent 12 may obtain the WebRTC interactive flow QoS characteristic from the WebRTC functionality provider 30. By way of example, the WebRTC interactive flow QoS characteristic may comprise data provided to or obtained by the WebRTC functionality provider 30 via the Real-time Transport Control Protocol (RTCP). Some embodiments may provide that the QoS acquisition agent 12 may obtain the WebRTC interactive flow QoS characteristic from an operating system executing on the first computing device 16, and/or from hardware associated with the first computing device 16 such as a network interface card (not shown).

As non-limiting examples, the WebRTC interactive flow QoS characteristic may include a throughput level, a transmitted octet count, a transmitted packet count, a dropped packet count, a jitter level, a latency level, an out-of-order delivery indication, a round-trip delay time, a Mean Opinion Score (MOS), a session identifier, a network address, and/or a timestamp. In some embodiments, the WebRTC interactive flow QoS characteristic may represent an "end-to-end" attribute of the WebRTC interactive flow 42, indicating a quality of the WebRTC interactive flow 42 as a whole. Some embodiments may provide that the WebRTC interactive flow QoS characteristic represents a "hop-by-hop" attribute indicating a quality of the WebRTC interactive flow 42 as it passes between intermediate network elements (e.g., as the WebRTC interactive flow 42 passes from the network element 52 to the first WebRTC client 18).

As indicated by arrow 56, the QoS acquisition agent 12 communicates the WebRTC interactive flow QoS characteristic indicating a quality of the WebRTC interactive flow 42 to the QoS monitoring agent 14. The QoS monitoring agent 14 may be located on the first computing device 16, on a different computing device within the same public or private network as the first computing device 16, and/or on a computing device in a separate, communicatively coupled public or private network. In some embodiments, the QoS acquisition agent 12 is communicatively coupled to the QoS monitoring agent 14 via HTTP, Hyper Text Transfer Protocol Secure (HTTPS), and/or a WebSockets connection, as non-limiting examples.

The QoS monitoring agent 14 then initiates a network management task (not shown) based on the WebRTC interactive flow QoS characteristic communicated by the QoS acquisition agent 12. In some embodiments, the network management task may include initiating an immediate modification to the network, automatically triggering an alarm 58, and/or causing an automatic or semi-automatic script 60 to execute, based on the WebRTC interactive flow QoS characteristic. Some embodiments may provide that the network management task is initiated by the QoS monitoring agent 14 by communicating with a network element such as the network element 52.

Some embodiments may provide that the QoS monitoring agent 14 may store the WebRTC interactive flow QoS characteristic employing any appropriate data repository (not shown) known to one of skill in the art. Storing the WebRTC interactive flow QoS characteristic may include storing the WebRTC interactive flow QoS characteristic in a volatile or non-volatile memory, in one or more in-memory data structures, and/or in a relational or object-oriented database, as non-limiting examples. The QoS monitoring agent 14 may then correlate two or more stored QoS characteristics, and may initiate the network management task based on the correlating. As non-limiting examples, the QoS monitoring agent 14 may generate a report 62 based on the correlating, and/or may initiate a modification to the network based on the correlating. In some embodiments, the two or more stored QoS characteristics may be correlated based upon an attribute common to the two or more stored QoS characteristics, such as a common session identifier, a common network address, and/or a common timestamp. It is to be understood that the two or more stored QoS characteristics together may relate to a single WebRTC interactive flow, or to multiple WebRTC interactive flows occurring simultaneously and/or over a defined time period. In this manner, the QoS monitoring agent 14 may guide network optimization for the WebRTC interactive flow 42 and/or other concurrent or future WebRTC interactive flows, including dynamically adjusting network attributes or routing in real-time to improve QoS characteristics.

According to some embodiments described herein, the QoS monitoring agent 14 may be communicatively coupled to the network element 52 (as indicated by bidirectional dashed arrow 64), and may obtain a QoS characteristic provided by the network element 52. As noted above, the network element 52 may be a server providing media transport and/or media processing functionality such as a TURN server, a media server, a router, a session border controller (SBC), and/or a network switch, as non-limiting examples. It is to be understood that the network may include more than one network element 52. In some embodiments, the QoS monitoring agent 14 may store the QoS characteristic provided by the network element 52, and may correlate the QoS characteristic provided by the network element 52 with other stored QoS characteristics as described above.

Some embodiments may provide that the QoS acquisition agent 12 may communicate the QoS characteristic over a secure WebRTC data flow (not shown) established between the QoS acquisition agent 12 and the QoS monitoring agent 14. In such embodiments, the QoS monitoring agent 14 may also obtain a WebRTC data flow QoS characteristic indicating a quality of the secure WebRTC data flow between the QoS acquisition agent 12 and the QoS monitoring agent 14. Some embodiments may provide that the WebRTC data flow QoS characteristic may be stored by the QoS monitoring agent 14, and may be correlated with other stored QoS characteristics as described above. In this manner, the WebRTC data flow QoS characteristic may provide additional useful insight into QoS attributes of the network.

Figure 2:
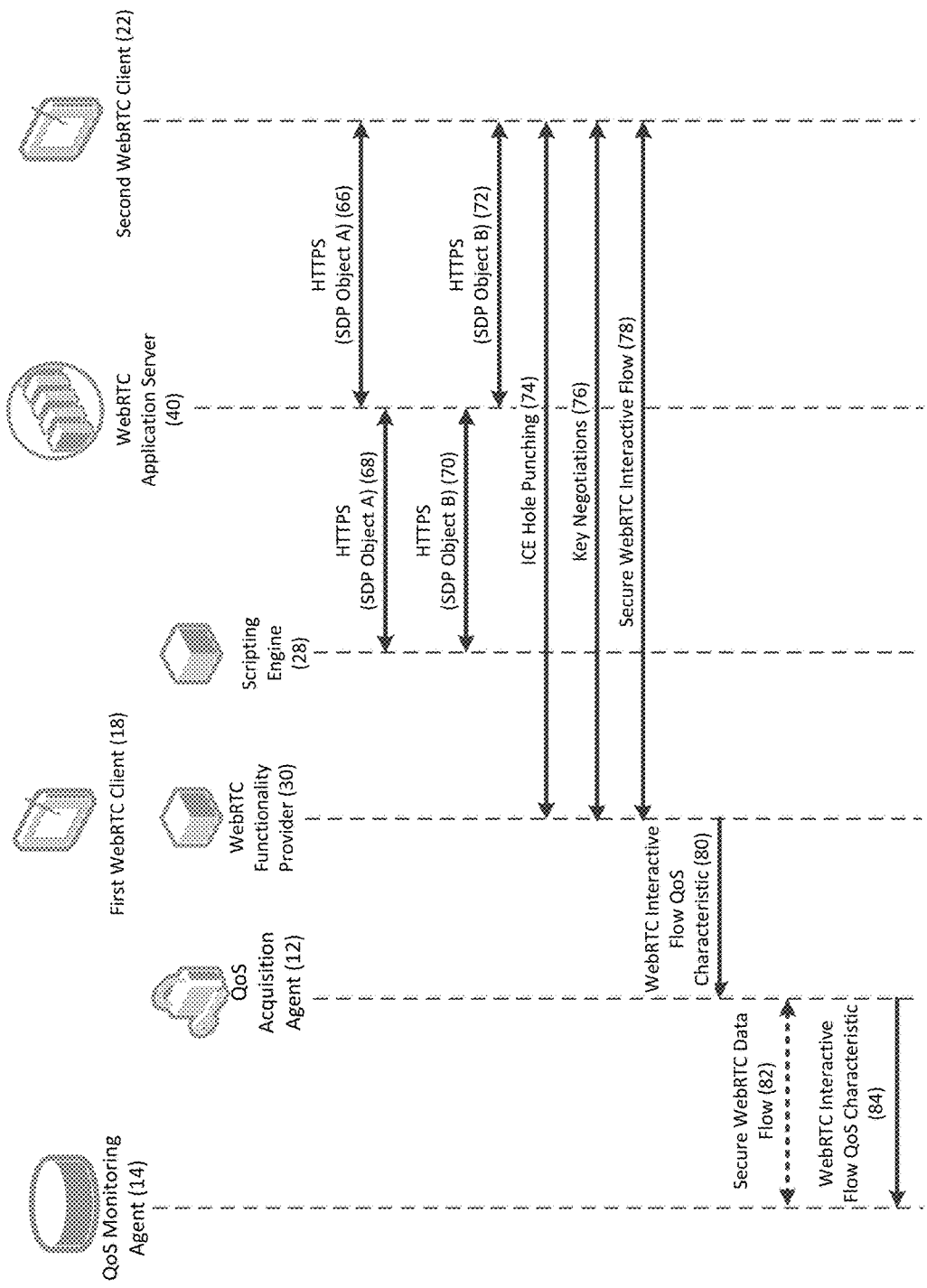
FIG. 2 is a diagram illustrating exemplary communications flows within an exemplary system including a QoS acquisition agent and a QoS monitoring agent.

To illustrate exemplary communications flows during the acquiring and correlating of QoS characteristics by the QoS acquisition agent 12 and the QoS monitoring agent 14 of FIG. 1, FIG. 2 is provided. In FIG. 2, the QoS monitoring agent 14, the first WebRTC client 18, the WebRTC application server 40, and the second WebRTC client 22 of FIG. 1 are each represented by vertical dotted lines. The QoS acquisition agent 12, the WebRTC functionality provider 30, and the scripting engine 28 of the first WebRTC client 18 are shown as separate elements to better illustrate communications flows therebetween. It is to be understood that the second WebRTC client 22 may comprise the scripting engine 32 and the WebRTC functionality provider 34 of FIG. 1, which for the sake of clarity are omitted from this example. It is to be further understood that the first and second WebRTC clients 18 and 22 have each downloaded a WebRTC-enabled web application, such as an HTML5/JavaScript WebRTC application, from the WebRTC application server 40.

As seen in FIG. 2, the establishment of a WebRTC interactive flow begins with a WebRTC offer/answer exchange that corresponds to the peer connection initiation dialogue 48 of FIG. 1. Accordingly, the second WebRTC client 22 sends a session description object to the WebRTC application server 40 in an encrypted format (in this example, via an HTTPS connection). The WebRTC session description object is a Session Description Protocol (SDP) object referred to as SDP Object A, and is indicated by arrow 66. SDP Object A represents the "offer" in the WebRTC offer/answer exchange. SDP Object A specifies the media types and capabilities that the second WebRTC client 22 supports and prefers for use in the WebRTC interactive flow. As indicated by arrow 68, the WebRTC application server 40 forwards the SDP Object A by a secure web connection to the scripting engine 28 of the first WebRTC client 18 for conventional processing.

After the scripting engine 28 receives the SDP Object A from the WebRTC application server 40, the scripting engine 28 in response sends a WebRTC session description object, referred to as SDP Object B, to the WebRTC application server 40 via a secure network connection, as indicated by arrow 70. The SDP Object B in this example represents the "answer" in the WebRTC offer/answer exchange. The WebRTC application server 40, in turn, forwards the SDP Object B to the second WebRTC client 22, as shown by arrow 72.

With continuing reference to FIG. 2, the first and second WebRTC clients 18 and 22 (in particular, the WebRTC functionality provider 30) then begin "hole punching" to determine the best way to establish direct communications between the first and second WebRTC clients 18 and 22. The hole punching process is indicated by bidirectional arrow 74 in FIG. 2. Hole punching is a technique, often using protocols such as Interactive Connectivity Establishment (ICE), in which two web clients establish a connection with an unrestricted third-party server (not shown) that uncovers external and internal address information for use in direct communications. If the hole punching is successful, the second WebRTC client 22 and the WebRTC functionality provider 30 of the first WebRTC client 18 begin key negotiations to establish a secure peer connection (indicated by bidirectional arrow 76). Upon establishing a secure peer connection, the second WebRTC client 22 and the WebRTC functionality provider 30 of the first WebRTC client 18 begin exchanging a secure WebRTC interactive flow, as shown by bidirectional arrow 78.

As the WebRTC interactive flow progresses, the QoS acquisition agent 12 of the first WebRTC client 18 obtains a WebRTC interactive flow QoS characteristic from the WebRTC functionality provider 30 (indicated by arrow 80).

It is to be understood that, in some embodiments, the QoS acquisition agent 12 may obtain the WebRTC interactive flow QoS characteristic from other sources, such as an operating system executing on the first computing device 16, and/or from hardware associated with the first computing device 16 such as a network interface card, as non-limiting examples. The WebRTC interactive flow QoS characteristic obtained by the QoS acquisition agent 12 may include a throughput level, a transmitted octet count, a transmitted packet count, a dropped packet count, a jitter level, a latency level, an out-of-order delivery indication, a round-trip delay time, a MOS, a session identifier, a network address, and/or a timestamp, as non-limiting examples. The QoS acquisition agent 12 communicates the WebRTC interactive flow QoS characteristic to the QoS monitoring agent 14. In some embodiments, the WebRTC interactive flow QoS characteristic may be communicated via a secure HTTP/HTTPS connection or WebSockets connection, while some embodiments may provide that the WebRTC interactive flow QoS characteristic is communicated via a WebRTC data flow established between the QoS acquisition agent 12 and the QoS monitoring agent 14. In the latter scenario, the QoS acquisition agent 12 and the QoS monitoring agent 14 first establish a secure WebRTC data flow, as indicated by bidirectional dashed arrow 82. The QoS acquisition agent 12 then communicates the WebRTC interactive flow QoS characteristic to the QoS monitoring agent 14 as shown by arrow 84.

Figure 3:
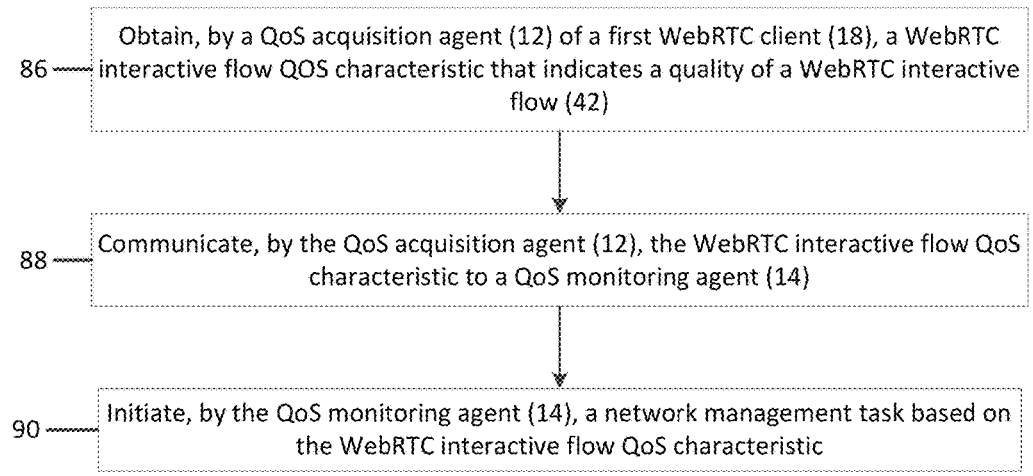
FIG. 3 is a flowchart illustrating exemplary operations for providing network management based on monitoring QoS characteristics of WebRTC interactive flows.

To generally describe exemplary operations of the QoS acquisition agent 12 and the QoS monitoring agent 14 for providing network management based on monitoring QoS characteristics, FIG. 3 is provided. For the sake of clarity, FIG. 3 refers to elements of the exemplary WebRTC interactive system 10 of FIG. 1. In the example of FIG. 3, operations begin with the QoS acquisition agent 12 of the first WebRTC client 18 obtaining a WebRTC interactive flow QoS characteristic that indicates a quality of the WebRTC interactive flow 42 (block 86). The WebRTC interactive flow QoS characteristic may include a throughput level, a transmitted octet count, a transmitted packet count, a dropped packet count, a jitter level, a latency level, an out-of-order delivery indication, a round-trip delay time, a MOS, a session identifier, a network address, and/or a timestamp, as non-limiting examples. The WebRTC interactive flow QoS characteristic may comprise data provided to or obtained by the first WebRTC client 18 via RTCP. Some embodiments may provide that the QoS acquisition agent 12 may obtain the WebRTC interactive flow QoS characteristic from an operating system executing on the first computing device 16, and/or from hardware associated with the first computing device 16 such as a network interface card.

The QoS acquisition agent 12 then communicates the WebRTC interactive flow QoS characteristic of the WebRTC interactive flow 42 to the QoS monitoring agent 14 (block 88). Some embodiments may provide that the WebRTC interactive flow QoS characteristic may be communicated via a secure HTTP/HTTPS connection or WebSockets connection. In some embodiments, the WebRTC interactive flow QoS characteristic may be communicated via a WebRTC data flow established between the QoS acquisition agent 12 and the QoS monitoring agent 14.

The QoS monitoring agent 14 next initiates a network management task based on the WebRTC interactive flow QoS characteristic (block 90). In some embodiments, the network management task may include initiating an immediate modification to the network, automatically triggering an alarm 58, and/or causing an automatic or semi-automatic script 60 to execute, based on the WebRTC interactive flow QoS characteristic. Some embodiments may provide that initiating the network management task may include storing the WebRTC interactive flow QoS characteristic, correlating two or more stored QoS characteristics, and initiating the network management task based on the correlating. As non-limiting examples, the QoS monitoring agent 14 may generate a report 62 based on the correlating, and/or may initiate a modification to the network based on the correlating.

Figure 4A:
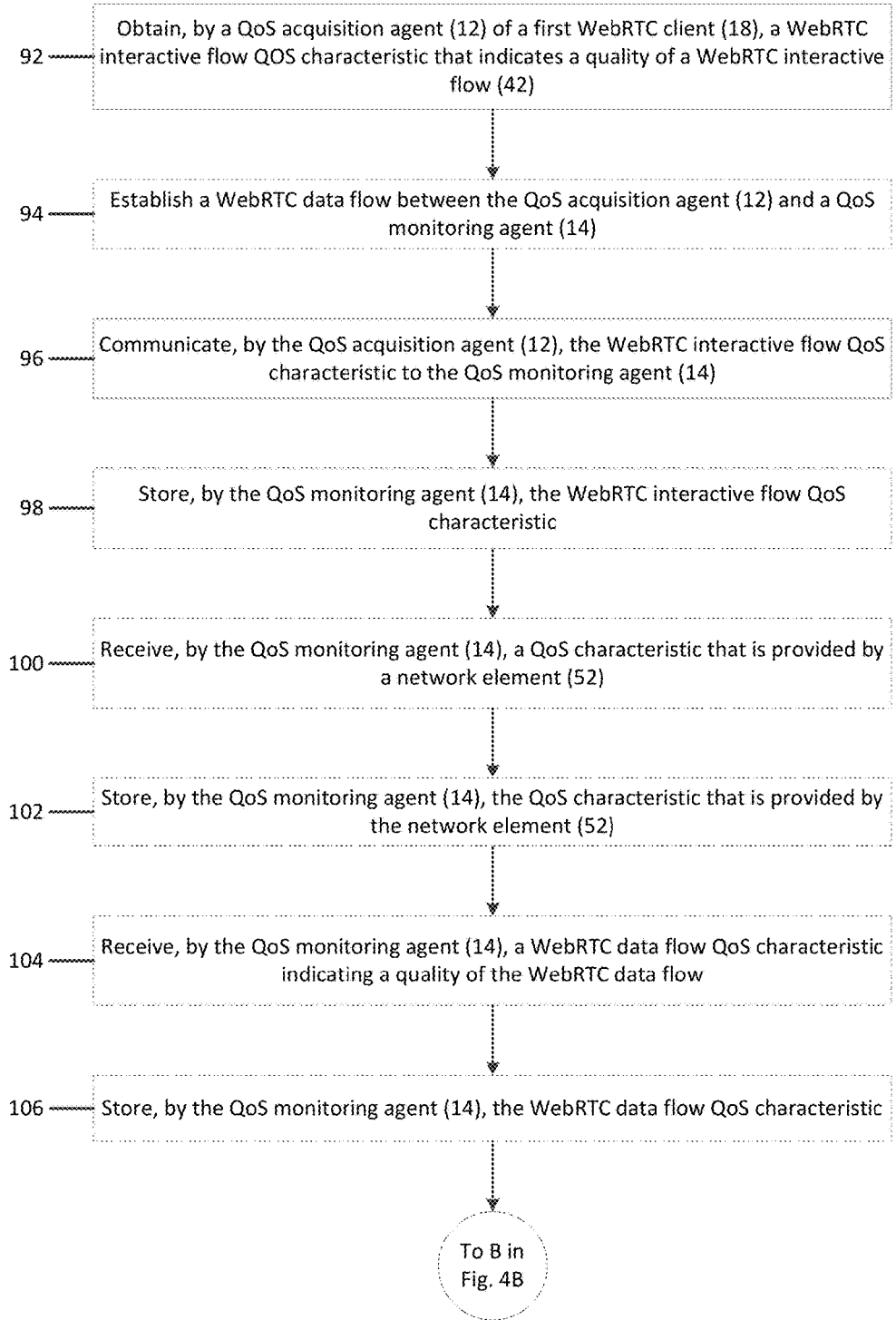
FIGS. 4A and 4B are flowcharts illustrating more detailed exemplary operations for providing network management based on monitoring QoS characteristics of WebRTC interactive flows.
Figure 4B:
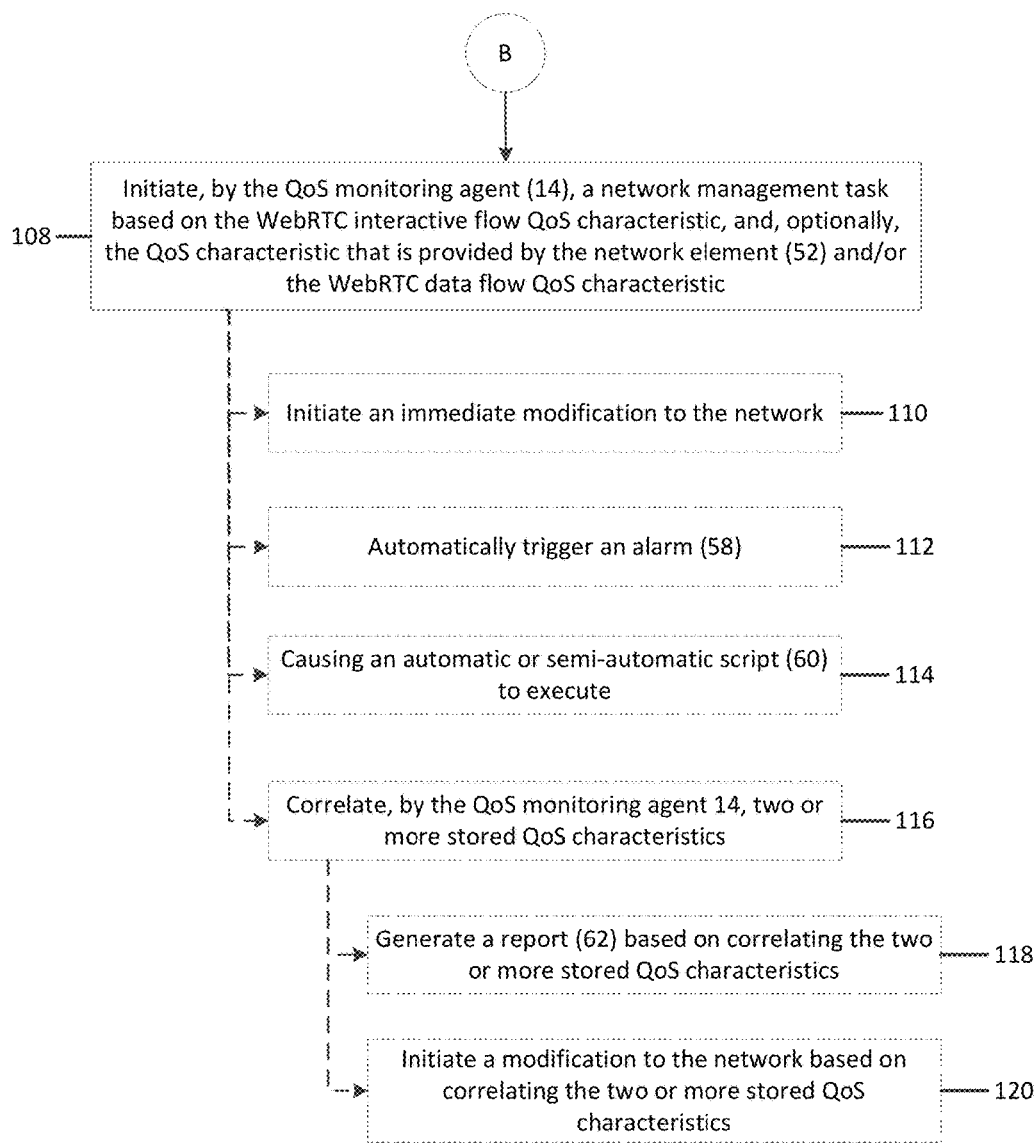

FIGS. 4A and 4B provide a more detailed exemplary generalized process for the QoS acquisition agent 12 and the QoS monitoring agent 14 of FIG. 1 to provide network management based on QoS characteristics of WebRTC interactive flows. FIG. 4A illustrates exemplary operations for receiving QoS characteristics from multiple sources, and storing the QoS characteristics for correlation. FIG. 4B shows exemplary operations for initiating a network management task based on QoS characteristics. For illustrative purposes, FIGS. 4A and 4B refer to elements of the exemplary WebRTC interactive system 10 of FIG. 1.

Referring now to FIG. 4A, operations begin with the QoS acquisition agent 12 of the first WebRTC client 18 obtaining a WebRTC interactive flow QoS characteristic that indicates a quality of the WebRTC interactive flow 42 (block 92). The WebRTC interactive flow QoS characteristic may include a throughput level, a transmitted octet count, a transmitted packet count, a dropped packet count, a jitter level, a latency level, an out-of-order delivery indication, a round-trip delay time, a MOS, a session identifier, a network address, and/or a timestamp, as non-limiting examples. The WebRTC interactive flow QoS characteristic may comprise data provided to or obtained by the first WebRTC client 18 via RTCP. Some embodiments may provide that the QoS acquisition agent 12 may obtain the WebRTC interactive flow QoS characteristic from an operating system executing on the first computing device 16, and/or from hardware associated with the first computing device 16 such as a network interface card.

Some embodiments may provide that the QoS acquisition agent 12 and the QoS monitoring agent 14 are configured to communicate via a secure HTTP/HTTPS connection or WebSockets connection, or via a WebRTC data flow established between the QoS acquisition agent 12 and the QoS monitoring agent 14. In the latter scenario, the QoS acquisition agent 12 may optionally establish a WebRTC data flow between the QoS acquisition agent 12 and the QoS monitoring agent 14 (block 94). The QoS acquisition agent 12 then communicates the WebRTC interactive flow QoS characteristic to the QoS monitoring agent 14 (block 96). The QoS monitoring agent 14 may then store the WebRTC interactive flow QoS characteristic of the WebRTC interactive flow 42 (block 98). According to some embodiments disclosed herein, storing the WebRTC interactive flow QoS characteristic of the WebRTC interactive flow 42 may comprise storing the WebRTC interactive flow QoS characteristic in a database or other data repository accessible to the QoS monitoring agent 14.

With continuing reference to FIG. 4A, the QoS monitoring agent 14 also may optionally receive a QoS characteristic provided by a network element 52 (block 100). The network element 52 may be a computing device having network communications capabilities and providing media transport and/or media processing functionality. As non-limiting examples, the network element 52 may be a TURN server, a media server, a router, a SBC, and/or a network switch. The QoS monitoring agent 14 may then store the QoS characteristic provided by the network element 52 (block 102). If the QoS acquisition agent 12 previously established a WebRTC data flow with the QoS monitoring agent 14 at block 94, the QoS monitoring agent 14 may obtain a WebRTC data flow QoS characteristic indicating a quality of the WebRTC data flow (block 104). The QoS monitoring agent 14 may then store the WebRTC data flow QoS characteristic (block 106). Processing then resumes at block 108 of FIG. 4B.

Referring now to FIG. 4B, the QoS monitoring agent 14 initiates a network management task based on the WebRTC interactive flow QoS characteristic, and, optionally, the QoS characteristic that is provided by the network element 52 and/or the WebRTC data flow QoS characteristic (block 108). FIG. 4B further illustrates operations that may comprise initiating the network management task according to some embodiments. In some embodiments, initiating the network management task may include initiating an immediate modification to the network (block 110). This may enable the QoS monitoring agent 14 to rapidly and dynamically respond to unfavorable network conditions. Some embodiments may provide that initiating the network management task may include automatically triggering an alarm 58 (block 112). Initiating the network management task may also include causing an automatic or semi-automatic script 60 to execute (block 114).

As part of the operation of initiating the network management task, the QoS monitoring agent 14 may correlate two or more stored QoS characteristics (block 116). The two or more stored QoS characteristics may include a WebRTC interactive flow QoS characteristic, a QoS characteristic provided by the network element 52, and/or a WebRTC data flow QoS characteristic. The two or more QoS characteristics may be correlated based upon an attribute common to the two or more stored QoS characteristics, such as a common session identifier, a common network address, and/or a common timestamp. Based on the correlation, the QoS monitoring agent 14 may generate a report 62 (block 118). The QoS monitoring agent 14 may also initiate a modification to the network based on correlating the two or more stored QoS characteristics (block 120).

Figure 5:
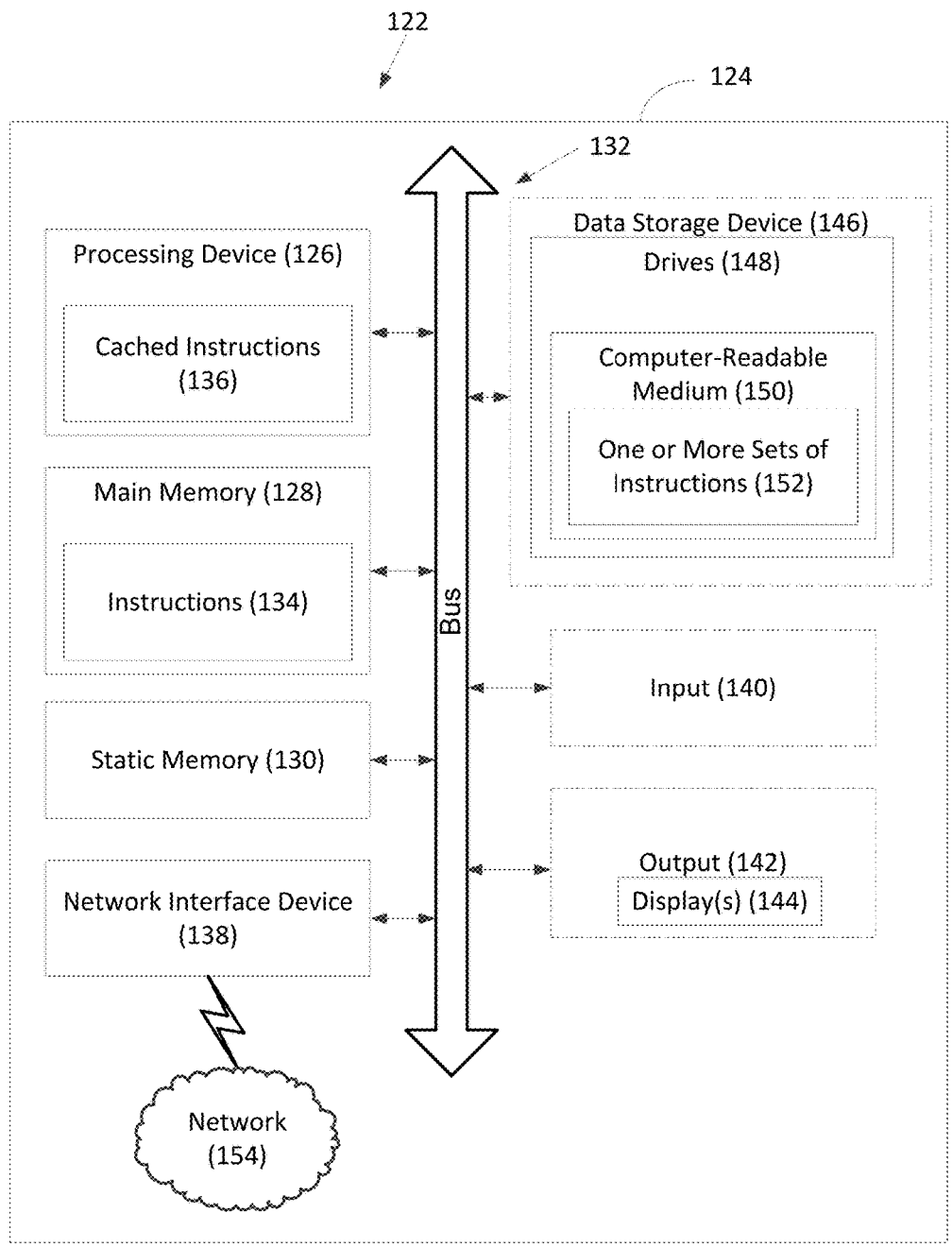
FIG. 5 is a block diagram of an exemplary processor-based system that may include the QoS acquisition agent and the QoS monitoring agent of FIG. 1.

FIG. 5 provides a schematic diagram representation of a processing system 122 in the exemplary form of an exemplary computer system 124 adapted to execute instructions to perform the functions described herein. In some embodiments, the processing system 122 may execute instructions to perform the functions of the QoS acquisition agent 12 and the QoS monitoring agent 14 of FIG. 1. In this regard, the processing system 122 may comprise the computer system 124, within which a set of instructions for causing the processing system 122 to perform any one or more of the methodologies discussed herein may be executed. The processing system 122 may be connected (as a non-limiting example, networked) to other machines in a local area network (LAN), an intranet, an extranet, or the Internet. The processing system 122 may operate in a client-server network environment, or as a peer machine in a peer-to-peer (or distributed) network environment. While only a single processing system 122 is illustrated, the terms "controller" and "server" shall also be taken to include any collection of machines that individually or jointly execute a set (or multiple sets) of instructions to perform any one or more of the methodologies discussed herein. The processing system 122 may be a server, a personal computer, a desktop computer, a laptop computer, a personal digital assistant (PDA), a computing pad, a mobile device, or any other device and may represent, as non-limiting examples, a server or a user's computer.

The exemplary computer system 124 includes a processing device or processor 126, a main memory 128 (as non-limiting examples, read-only memory (ROM), flash memory, dynamic random access memory (DRAM) such as synchronous DRAM (SDRAM), etc.), and a static memory 130 (as non-limiting examples, flash memory, static random access memory (SRAM), etc.), which may communicate with each other via a bus 132. Alternatively, the processing device 126 may be connected to the main memory 128 and/or the static memory 130 directly or via some other connectivity means.

The processing device 126 represents one or more processing devices such as a microprocessor, central processing unit (CPU), or the like. More particularly, the processing device 126 may be a complex instruction set computing (CISC) microprocessor, a reduced instruction set computing (RISC) microprocessor, a very long instruction word (VLIW) microprocessor, a processor implementing other instruction sets, or processors implementing a combination of instruction sets. The processing device 126 is configured to execute processing logic in instructions 134 and/or cached instructions 136 for performing the operations and steps discussed herein.

The computer system 124 may further include a communications interface in the form of a network interface device 138. It also may or may not include an input 140 to receive input and selections to be communicated to the computer system 124 when executing the instructions 134, 136. It also may or may not include an output 142, including but not limited to display(s) 144. The display(s) 144 may be a video display unit (as non-limiting examples, a liquid crystal display (LCD) or a cathode ray tube (CRT)), an alphanumeric input device (as a non-limiting example, a keyboard), a cursor control device (as a non-limiting example, a mouse), and/or a touch screen device (as a non-limiting example, a tablet input device or screen).

The computer system 124 may or may not include a data storage device 146 that includes using drive(s) 148 to store the functions described herein in a computer-readable medium 150, on which is stored one or more sets of instructions 152 (e.g., software) embodying any one or more of the methodologies or functions described herein. The functions can include the methods and/or other functions of the processing system 122, a participant user device, and/or a licensing server, as non-limiting examples. The one or more sets of instructions 152 may also reside, completely or at least partially, within the main memory 128 and/or within the processing device 126 during execution thereof by the computer system 124. The main memory 128 and the processing device 126 also constitute machine-accessible storage media. The instructions 134, 136, and/or 152 may further be transmitted or received over a network 154 via the network interface device 138. The network 154 may be an intra-network or an inter-network.

While the computer-readable medium 150 is shown in an exemplary embodiment to be a single medium, the term "machine-accessible storage medium" should be taken to include a single medium or multiple media (as non-limiting examples, a centralized or distributed database, and/or associated caches and servers) that store the one or more sets of instructions 152. The term "machine-accessible storage medium" shall also be taken to include any medium that is capable of storing, encoding, or carrying a set of instructions for execution by the machine, and that cause the machine to perform any one or more of the methodologies disclosed herein. The term "machine-accessible storage medium" shall accordingly be taken to include, but not be limited to, solid-state memories, optical and magnetic media, and carrier wave signals.

The embodiments disclosed herein may be embodied in hardware and in instructions that are stored in hardware, and may reside, as non-limiting examples, in Random Access Memory (RAM), flash memory, Read Only Memory (ROM), Electrically Programmable ROM (EPROM), Electrically Erasable Programmable ROM (EEPROM), registers, a hard disk, a removable disk, a CD-ROM, or any other form of computer readable medium known in the art. An exemplary storage medium is coupled to the processor such that the processor can read information from, and write information to, the storage medium. In the alternative, the storage medium may be integral to the processor. The processor and the storage medium may reside in an Application Specific Integrated Circuit (ASIC). The ASIC may reside in a remote station. In the alternative, the processor and the storage medium may reside as discrete components in a remote station, base station, or server.

It is also noted that the operational steps described in any of the exemplary embodiments herein are described to provide examples and discussion. The operations described may be performed in numerous different sequences other than the illustrated sequences. Furthermore, operations described in a single operational step may actually be performed in a number of different steps. Additionally, one or more operational steps discussed in the exemplary embodiments may be combined. It is to be understood that the operational steps illustrated in the flow chart diagrams may be subject to numerous different modifications as will be readily apparent to one of skill in the art. Those of skill in the art would also understand that information and signals may be represented using any of a variety of different technologies and techniques. As non-limiting examples, data, instructions, commands, information, signals, bits, symbols, and chips that may be referenced throughout the above description may be represented by voltages, currents, electromagnetic waves, magnetic fields or particles, optical fields or particles, or any combination thereof.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein, but is to be accorded the widest scope consistent with the principles and novel features disclosed herein.

What is claimed is:

1. A method for providing network management based on monitoring Quality of Service (QoS) characteristics of Web Real-Time Communications (WebRTC) interactive flows, comprising:

establishing, by a first WebRTC client executing on a first computing device on a first network, a current WebRTC interactive flow between the first WebRTC client and a second WebRTC client executing on a second computing device on a second network through a network element of the first network, wherein the first network is a private network and the second network is a public network;

obtaining, by a QoS acquisition agent executing on the first computing device, a WebRTC interactive flow QoS characteristic that indicates a quality of the current WebRTC interactive flow between the first WebRTC client and the second WebRTC client;

communicating, by the QoS acquisition agent, the WebRTC interactive flow QoS characteristic to a QoS monitoring agent over the first network, wherein the QoS monitoring agent is external to the first WebRTC client, the second WebRTC client, and the WebRTC interactive flow;

correlating, by the QOS monitoring agent, the WebRTC interactive flow QoS characteristic communicated by the QoS acquisition agent with one or more stored WebRTC interactive flow QoS characteristics; and initiating, by the QoS monitoring agent, a network management task on the second network based on the correlated WebRTC interactive flow QoS characteristics.

2. The method of claim 1, wherein initiating the network management task comprises initiating an immediate modification to the second network.

3. The method of claim 1, wherein initiating the network management task comprises automatically triggering an alarm.

4. The method of claim 1, further comprising storing, by the QoS monitoring agent, the WebRTC interactive flow QoS characteristic.

5. The method of claim 4, wherein initiating the network management task further comprises generating a report based on correlating the two or more stored WebRTC interactive flow QoS characteristics.

6. The method of 4, wherein initiating the network management task further comprises initiating a modification to the second network based on correlating the two or more stored WebRTC interactive flow QoS characteristics.

7. The method of claim 1, wherein the WebRTC interactive flow QoS characteristic comprises a throughput level, a transmitted octet count, a transmitted packet count, a dropped packet count, a jitter level, a latency level, an out-of-order delivery indication, a round-trip delay time, a Mean Opinion Score (MOS), a session identifier, a network address, or a timestamp, or combinations thereof.

8. The method of claim 1, further comprising obtaining, by the QoS monitoring agent, a QoS characteristic that is provided by a network element of the second network;

wherein initiating the network management task is further based on the QoS characteristic that is provided by the network element of the second network.

9. The method of claim 8, further comprising storing, by the QoS monitoring agent, the QoS characteristic that is provided by the network element of the second network;

wherein initiating the network management task comprises:

correlating, by the QoS monitoring agent, two or more stored QoS characteristics; and initiating the network management task based on a result of the correlating.

10. The method of claim 1, wherein communicating, by the QoS acquisition agent, the WebRTC interactive flow QoS characteristic comprises:

establishing a second WebRTC interactive flow between the QoS acquisition agent and the QoS monitoring agent over the first network; and communicating, by the QoS acquisition agent, the WebRTC interactive flow QoS characteristic via the second WebRTC interactive flow.

11. The method of claim 10, further comprising:

obtaining, by the QoS monitoring agent, a second WebRTC interactive flow QoS characteristic that indicates a quality of the second WebRTC interactive flow; and wherein initiating the network management task is further based on the second WebRTC interactive flow QoS characteristic.

12. The method of claim 11, further comprising storing, by the QoS monitoring agent, the second WebRTC interactive flow QoS characteristic;

wherein initiating the network management task comprises:

correlating, by the QoS monitoring agent, two or more stored QoS characteristics; and initiating the network management task based on a result of the correlating.

13. A system comprising:

a private network;

a public network;

a first computing device on the private network;

a network element of the private network and external to the first computing device, the network element comprising one of a Traversal Using Relays around NAT (TURN) server, a media server, a router, a session border controller (SBC), or a network switch; and a second computing device on the public network, the first computing device comprising a processor and a memory coupled with and readable by the processor and storing therein a set of instructions which, when executed by the processor, causes the processor to monitor Quality of Service (QoS) characteristics of Web Real-Time Communications (WebRTC) interactive flows by:

establishing, by a first WebRTC client executing on the first computing device, a current WebRTC interactive flow between the first WebRTC client and a second WebRTC client executing on the second computing device through the network element of the private network;

obtain, by a QoS acquisition agent executing on the first computing device, a WebRTC interactive flow QoS characteristic that indicates a quality of a current WebRTC interactive flow between the first WebRTC client and the second WebRTC client; and communicate, by the QoS acquisition agent, the WebRTC interactive flow QoS characteristic to a QoS monitoring agent over the private network and wherein the QoS monitoring agent is external to the WebRTC interactive flow and is configured to correlate the WebRTC interactive flow QoS characteristic communicated by the QoS acquisition agent with one or more stored WebRTC interactive flow QoS characteristics and initiate a network management task on the public network based on the correlated WebRTC interactive flow QoS characteristics.

14. The system of claim 13, wherein the instructions further cause the QoS monitoring agent to:

store the WebRTC interactive flow QoS characteristic.

15. The system of claim 13, wherein the instructions further cause the QoS monitoring agent to:

obtain a QoS characteristic that is provided by the network element; and initiate the network management task further based on the QoS characteristic that is provided by the network element.

16. The system of claim 15, wherein the instructions further cause the QoS monitoring agent to:
- store the QoS characteristic that is provided by the network element;
- correlate two or more stored QoS characteristics; and
- initiate the network management task based on a result of the correlating.

17. A non-transitory computer-readable medium having stored thereon computer-executable instructions to cause a processor to implement a method, comprising:
- establishing, by a first WebRTC client executing on a first computing device on a first network, a current WebRTC interactive flow between the first WebRTC client and a second WebRTC client executing on a second computing device on a second network through a network element of the first network, wherein the first network is a private network and the second network is a public network;
- obtaining, by a QoS acquisition agent executing on the first computing device, a WebRTC interactive flow QoS characteristic that indicates a quality of the current WebRTC interactive flow between the first WebRTC client and the second WebRTC client;
- communicating, by the QoS acquisition agent, the WebRTC interactive flow QoS characteristic to a QoS monitoring agent over the first network, wherein the QoS monitoring agent is external to the first WebRTC client, the second WebRTC client, and the WebRTC interactive flow;
- correlating, by the QOS monitoring agent, the WebRTC interactive flow QoS characteristic communicated by the QoS acquisition agent with one or more stored WebRTC interactive flow QoS characteristics; and
- initiating, by the QoS monitoring agent, a network management task on the second network based on the correlated WebRTC interactive flow QoS characteristics.

18. The non-transitory computer-readable medium of claim 17 having stored thereon the computer-executable instructions to cause the processor to implement the method, further comprising storing, by the QoS monitoring agent, the WebRTC interactive flow QoS characteristic.

19. The non-transitory computer-readable medium of claim 17 having stored thereon the computer-executable instructions to cause the processor to implement the method, further comprising obtaining, by the QoS monitoring agent, a QoS characteristic that is provided by a network element of the second network;
- wherein initiating the network management task is further based on the QoS characteristic that is provided by the network element of the second network.

20. The non-transitory computer-readable medium of claim 19 having stored thereon the computer-executable instructions to cause the processor to implement the method, further comprising storing, by the QoS monitoring agent, the QoS characteristic that is provided by the network element of the second network;
- wherein initiating the network management task comprises:
  - correlating, by the QoS monitoring agent, two or more stored QoS characteristics; and
  - initiating the network management task based on a result of the correlating.

* * * * *